Feb. 25, 1930.　　　K. RASMUSSEN　　　1,748,244
DRIVE GEAR FOR LOCOMOTIVES
Original Filed Dec. 15, 1926　　3 Sheets-Sheet 1

Inventor
Kristian Rasmussen
By Poppand Powers
Attorney

Feb. 25, 1930. K. RASMUSSEN 1,748,244
DRIVE GEAR FOR LOCOMOTIVES
Original Filed Dec. 15, 1926  3 Sheets-Sheet 2
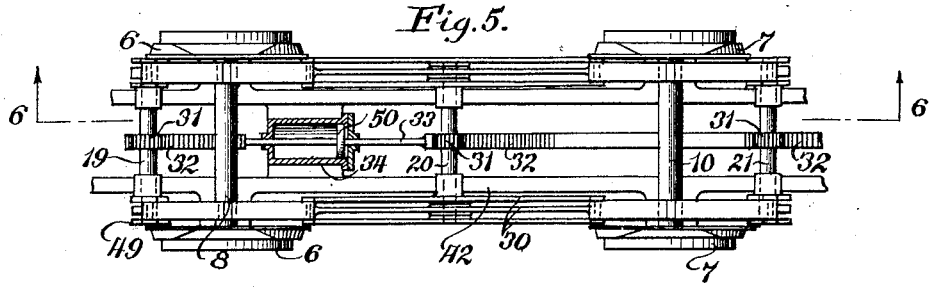
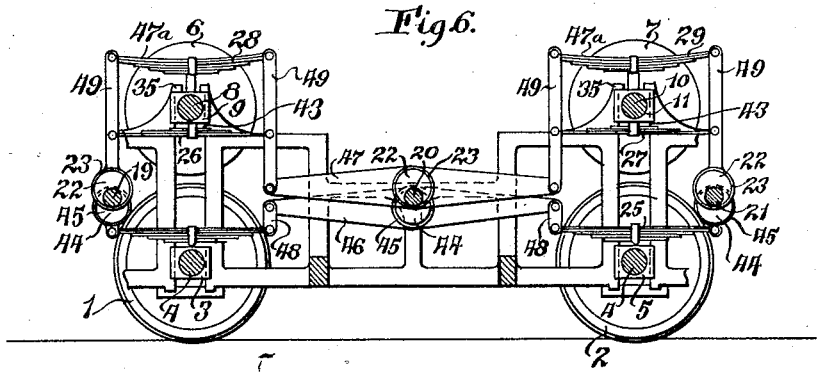
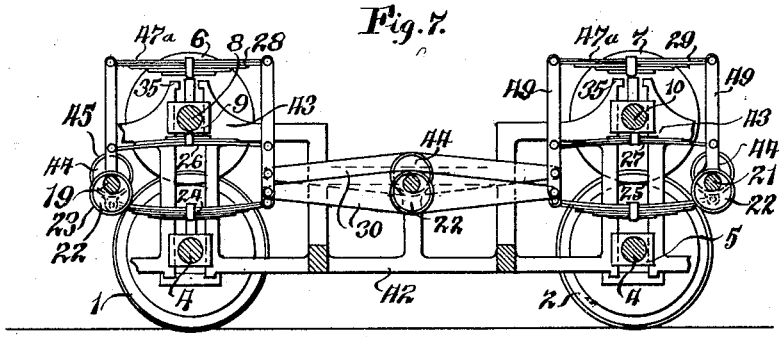
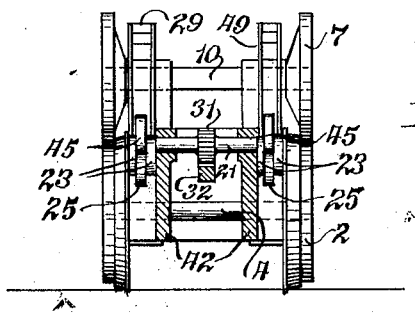
Inventor
Kristian Rasmussen
By Popp and Powers.
Attorney Patented Feb. 25, 1930

1,748,244

UNITED STATES PATENT OFFICE

KRISTIAN RASMUSSEN, OF BUFFALO, NEW YORK

DRIVE GEAR FOR LOCOMOTIVES

Original application filed December 15, 1926, Serial No. 154,951. Divided and this application filed October 27, 1927. Serial No. 229,115.

This application is a division of my pending application Ser. No. 154,951 filed December 15, 1926.

My invention relates to drive gear for locomotives and particularly to the construction and arrangement of driving wheels and power means for operating them.

The engines commonly employed for the propulsion of locomotives operate more efficiently and economically when a certain momentum of the locomotive has been attained than is the case while the locomotive is being brought to such a speed from a state of rest. Certain types of engines, for example, steam turbines and internal combustion engines, are especially advantageous for the operation of locomotives, since they may be so constructed as to be relatively small in compass and of light weight. Engines of these types develop high power and are highly efficient and economical in operation, but these results are obtainable only when the engines are operating at or above a certain predetermined number of revolutions per minute.

Hence, where the prime mover is directly connected to the driving wheels of the locomotive, considerable difficulty may be had in starting the locomotive, and the operation of the locomotive may be uneconomical at low speeds. My invention is designed and adapted for use in connection with any type or construction of prime mover for locomotives, but, as indicated above, is particularly applicable to and advantageous in the operation of a locomotive driven by an engine such as a steam turbine or internal combustion motor.

One of the principal objects of my invention is to provide a locomotive with drive mechanism of such character and arrangement as will enable the operation of the locomotive to be effected with a maximum facility and economy at any speed, including starting speed.

A further object of my invention is the provision of means for operating a locomotive with facility and economy at high speeds and associated means for effecting such operation with equal facility and economy at low speeds, including starting speed.

Another object of my invention is the provision of improved mechanism for the propulsion of locomotives by high speed engines by associating therewith auxiliary driving mechanism by means of which the locomotive may be operated in starting and at low speeds, or at speeds at which direct actuation of the driving wheels of the locomotive by the engine would be comparatively difficult or expensive.

A still further object of my invention is the provision of independent drive gear systems, one designed and adapted to be used in starting and at low speeds, and the other at relatively high speeds.

In order to accomplish these beneficial results, I provide a locomotive with two sets of driving wheels, which may be termed main drivers and secondary drivers, the main drivers to be used only at relatively high speeds, and preferably directly connected to the driving engine by mechanical transmission, while the secondary drivers are so mounted that they may be lowered to exert a propelling influence upon the locomotive or raised to operate as idlers. The several sets of driving wheels are suitably mounted upon spring suspension systems so constructed as to permit one or the other or both of the sets of drivers to be in effective driving position.

According to the invention the secondary drivers are adjustably mounted above the main drivers and may be positioned to act frictionally upon the main drivers or to be raised to rotate free of the same.

Tractive power for both drive systems may be furnished by the same driving engine either by mechanical, hydraulic, compressed air, steam or electric transmission or by combinations of these means.

In the drawings I have illustrated in detail these specific embodiments of my invention, and have further illustrated several advantageous adaptations of each to locomotive driving engines and drive gear of various types and constructions.

In the drawings, in which like numerals refer to similar parts throughout the views:

Fig. 5 is a plan view of the running gear of the locomotive, a portion thereof being shown in section.

Fig. 6 is a cross-sectional view taken on the line 6—6 of Fig. 5 and showing the running gear of the locomotive in starting position, as in Fig. 1.

Fig. 7 is a view similar to Fig. 6, but showing the running gear as it appears when the locomotive is running at normal speeds, as in Fig. 2.

Fig. 8 is an end view of the locomotive running gear as it appears when the locomotive is moving at normal speeds, with the parts positioned as shown in Fig. 2.

Figure 1:
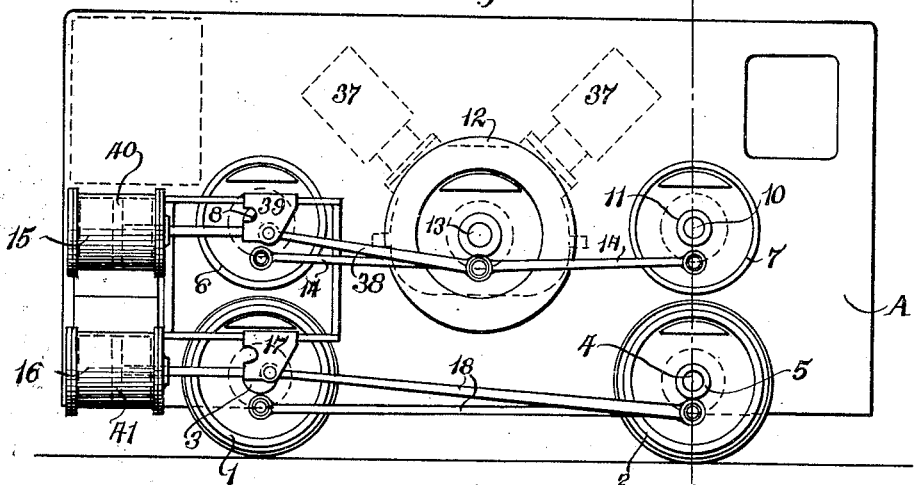
Fig. 1 is a side elevational view of the driving gear of a locomotive constructed according to my invention, the driving gear being shown as it appears when in position for starting the locomotive and for operation at low speed.

The main drivers or driving wheels 1 and 2 of the locomotive A rest upon the track rails, while the secondary driving wheels 6 and 7 are mounted directly above wheels 1 and 2, respectively, and are so mounted that they may be lowered to act frictionally upon the main drivers or raised to operate free of the main drivers. The drivers 1 and 2 are carried upon axles 4 supported in journal-boxes 3 and 5. Secondary driving wheels 6 and 7 are similarly carried on axles 8 and 10 supported in journal-boxes 9 and 11.

A motor 12, preferably of the internal combustion type, and provided with cylinders 37, is mounted preferably between the secondary driving axles and this motor rotates a main engine shaft 13 carrying a flywheel. The motor 12 has a direct driving connection through connecting rods 14 with the secondary driving wheels 6 and 7 and an indirect driving connection through connecting rod 38 and suitable mechanical or fluid-operated devices, to the main driving wheels 1 and 2. In the preferred construction of this form of my invention connecting rod 38 is pivotally attached to a cross-head 39 attached to a piston 40 working in an air or other fluid-type compressor 15. The compressor 15 is connected to a motor cylinder 16 by suitable piping, not shown, and thus drives a piston 41, crosshead 17 and connecting rods 18 to operate the main driving wheels 1 and 2.

Figure 2:
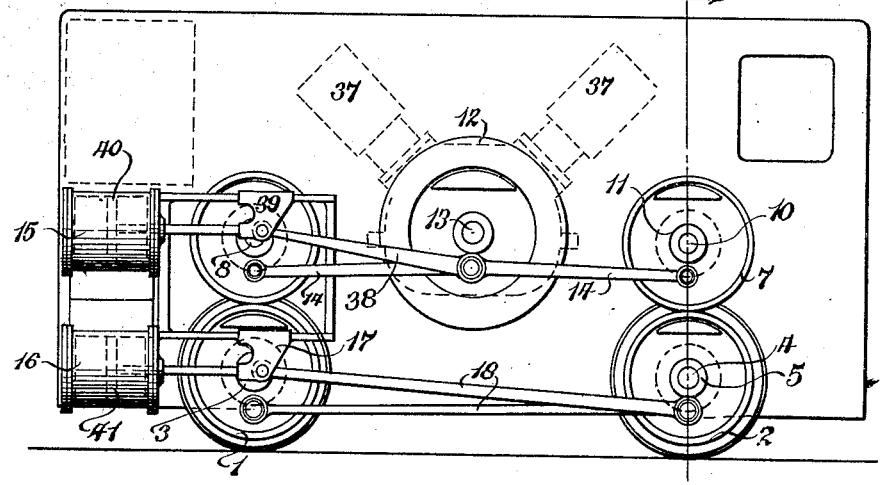
Fig. 2 is a view similar to that of Fig. 1, but with the driving gear shown as it appears when in normal running position at relatively high speeds.
Figure 3:
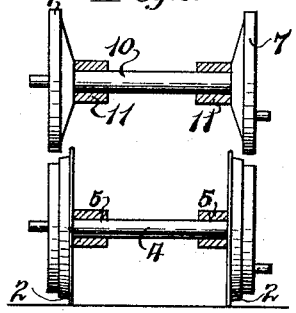
Fig. 3 is a cross-sectional view taken on the line 3—3 of Fig. 1.
Figure 4:
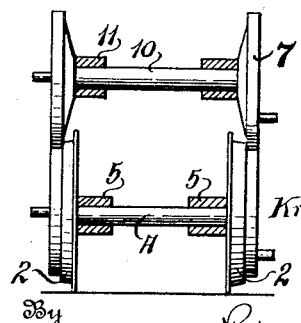
Fig. 4 is a cross-sectional view taken on the line 4—4 of Fig. 2.

The method of driving the locomotive shown in Figs. 1 to 8, inclusive, is as follows: When the locomotive is at rest and is to be started, the secondary drivers 6 and 7 will be raised from contact with the main drivers 1 and 2 by a mechanism hereinafter described. The secondary drivers will then be in the position shown in Fig. 1. Operation of the motor 12 will cause the secondary drivers 6 and 7 to idle and will operate the compressor 15 through the connections 38 and 39. The compressed fluid may then be caused to act upon the piston 41 in cylinder 16 with the result that the main drivers 1 and 2 will be turned and the locomotive will be caused to move. When the locomotive attains a speed which will enable it to be more efficiently operated by direct drive from engine 12, the secondary drivers 6 and 7 will be lowered to bear upon the main drivers 1 and 2, as shown in Figs. 2 and 4, and the motor 12 will then act directly upon the main drivers through the frictional engagement of the secondary drivers therewith. At this time the valve mechanism of the cylinders 15 and 16 will be operated to store the air compressed by cylinder 15 in a suitable reservoir (not shown). It will be obvious that the speed of the locomotive may now be varied merely by changing the speed of the engine 12. When the locomotive is being indirectly driven, as in Figs. 1 and 3, the engine is enabled to run at higher speed than would be possible were it connected by direct transmission with driving wheels 1 and 2. The air thus compressed may be controlled and the speed of the locomotive regulated by operation of suitable valve mechanism, similar to the ordinary steam engine control mechanism, with which the cylinders 15 and 16 are equipped.

In accordance with my invention disclosed in Figs. 1 to 8, inclusive, and as heretofore stated, it is desirable that the weight of that portion of the locomotive which is above the lower or main driving wheels 1 and 2 may normally be transmitted to these drivers through the main axles 4 and that this weight may also be shifted to rest upon the main drivers at the points of contact of the secondary drivers 6 and 7 therewith. The mechanism employed for this purpose with the system of drive shown in Figs. 1 to 4, inclusive, is illustrated in Figs. 5 to 8, inclusive. In these latter views the main driver axles 4 are shown supported in a stationary underframe 42. The secondary driving axle journal-boxes 9 and 11 are supported to be vertically slidable in slideways 43 in the frame 42, upward movement of the journal-boxes being limited by shoulders 35. Shafts 19, 20 and 21 are journaled in the sides of the frame 42, shaft 19 being at one end of the frame, shaft 20 between the drivers, and shaft 21 at the opposite end of the frame. Each of the shafts 19, 20 and 21 is provided with a pair of eccentrics 22 and an intermediately arranged eccentric 44 at each end thereof, the eccentrics 22 being offset 180° relative to the eccentrics 44. Straps or bands 45, positioned to bear against the eccentrics 44, are connected to what may be termed a "lower spring suspension", generically indicated by the numeral 46 and comprising springs 24 and 25 bearing upon the main driver axles 4 and an equalizer 30, all joined by links 48. Bands 23, positioned upon the eccentrics 22, are connected to a secondary or upper spring suspension indicated by the numeral 47ª and comprising two upper springs 28 and 29, intermediate springs 26 and 27, directly beneath upper springs 28 and 29, respectively, and an equalizer 47. Links 49 connect the outer ends of the springs 26 and 28 and of springs 27 and 29 with their respective straps 23 and also join the inner ends of the pairs of springs to the ends of the equalizers 47. The intermediate springs 26 and 27 are beneath the secondary driving axles 8 and 10 and therefore directly bear the weight of these axles, while the springs 28 and 29 are above the axles 8 and 10 and directly support the locomotive body, i. e., substantially all of the weight of the locomotive except that portion shown in Figs. 1 to 8, inclusive.

The shafts 19, 20 and 21 are provided with gears 31 midway of their length and these are engaged by racks 32 upon a longitudinally slidable rod 33 actuated by a fluid operated piston 50 moving in a cylinder 34 (Fig. 5) or by any other suitable operating means. Operation of rod 33 serves to rotate the shafts 19, 20 and 21 and change the position of the eccentrics 22 and 44.

The operation of the above mechanism for shifting the weight of the locomotive and changing the position of the secondary drivers is as follows: When the locomotive drive is to be placed in starting position, as in Fig. 6, and the secondary drivers are to be raised from contact with the main drivers, the shafts 19, 20 and 21 are rotated by the racks 32 to move the eccentrics 22 to uppermost position and eccentrics 44 to lowermost position. This movement of eccentrics 22 raises the springs of the upper suspension 47ª and the intermediate springs 26 and 27 thus forcing the axles 8 and 10 and secondary drivers 6 and 7 upwardly and away from the main drivers, the upper springs 28 and 29, being at the same time released of their load. At the same time, the movement of the eccentrics 44 to lowermost position moves the lower springs 24 and 25 downwardly to bear upon the main driving axles 4. It will be seen that when the parts are thus positioned the locomotive body and the secondary drivers are supported upon the main drivers wholly through the springs 24 and 25 bearing upon the axles 4. This is the position shown in Fig. 6 and corresponds to the starting position of the driving mechanism shown in Figs. 1 and 3.

When the locomotive has attained the necessary speed to make direct driving (as shown in Fig. 2) desirable, the eccentrics 22 and 44 are moved 180°. Eccentrics 44 of the lower suspension are then in their upper positions and eccentrics 22 of the upper suspension are in their lower position. This movement of eccentrics 44 raises the lower springs 24 and 25 from the main driving axles 4, while the movement of eccentrics 22 lowers the intermediate springs 26 and 27, and relieves them of the weight of the secondary drivers 6 and 7 which are caused to bear upon the main drivers 1 and 2. The downward movement of the upper springs 28 and 29 causes them to bear upon the secondary axles 8 and 10. The result will be that, as shown in Figs. 7 and 8, substantially the entire spring-suspended weight of the locomotive will rest upon the secondary drivers 6 and 7 forcing them into frictional contact with the main drivers 1 and 2. The driving mechanism is now in the position shown in Figs. 2 and 4 and is adapted for direct drive of the main drivers. This position is preferably maintained while the locomotive is running at relatively high speeds. When the speed is reduced below a certain minimum, the secondary drivers will again be raised by the rack and pinion mechanism above described and the main drivers operated by the indirect driving connection through connecting rod 38.

Figure 9:
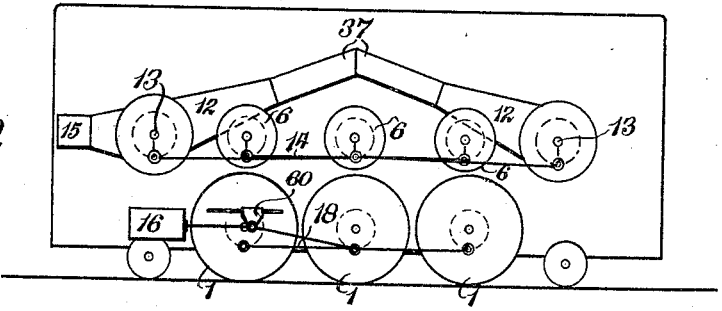
Figs. 9 and 10 are side elevational views showing, in starting and normal running positions, respectively, a modified adaptation of the form of driving gear illustrated in Figs. 1 to 8, inclusive.
Figure 10:
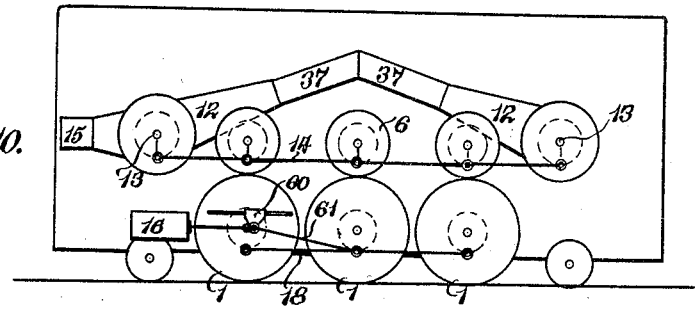

The driving mechanism shown in Figs. 9 and 10 is generally similar to that of Figs. 1 to 8, inclusive, the principal differences being in the use of two motors 12, with their cylinders 37, and a greater number of secondary and main drivers. This particular adaptation of my invention includes a main drive shaft 13 at each end of the set of secondary drivers 6, the shafts 13 and drivers 6 being connected by driving rods 14 to act synchronously. A compressor 15, also operated by the motors 12, and suitably connected to fluid motor 16 in a manner similar to that heretofore described, is adapted to drive the locomotive when the driving gear is in starting position, as shown in Fig. 9. A number of main drivers equal to the number of secondary drivers is provided and these are operatively connected to one another by rods 18 and to the fluid motor 16 by a crosshead 60 and rod 61. The drive thus described operates in normal running position (shown in Fig. 10) in a manner exactly similar to that of the mechanism of Figs. 1 to 8.

Figure 11:
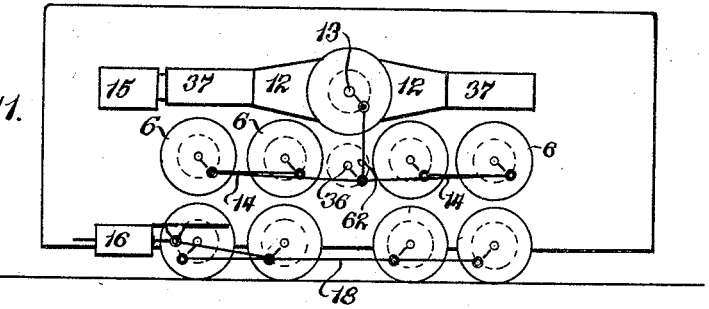
Figs. 11 and 12 are side elevational views showing, in starting and normal running positions, respectively, another modified adaptation of the form of driving gear illustrated in Figs. 1 to 8, inclusive.
Figure 12:
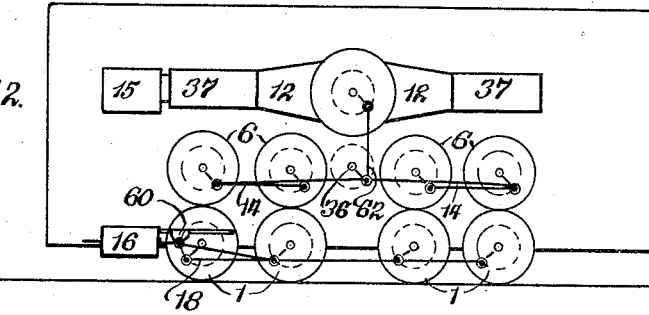

The form of my invention shown in Figs. 11 and 12 is the same as that described above except that two pairs of secondary drivers 6 are provided, with a jackshaft 36 between the pairs. The drive shaft 13 is connected to the jackshaft 36 by a connecting rod 62. The remainder of the construction of this form is similar to the two forms already described; its manner of operation is substantially the same as that of the Figs. 1 to 8 and Figs. 9 and 10 forms.

Having fully described my invention, I claim:

1. In a locomotive, an engine, main drive wheels, connections between said engine and said main drive wheels, secondary drive wheels connected to said engine and adapted to be moved into and out of frictional driving contact with said main drive wheels.

2. In a locomotive, an engine, main drive wheels, an air compressor actuated by said engine, connections between said air compressor and said main drive wheels for operating said main drive wheels, secondary drive wheels directly connected to said engine, and means for moving said secondary drive wheels into and out of frictional driving engagement with said main drive wheels.

3. In a locomotive, an engine, two independent sets of drive wheels, one set of wheels being adapted to be operated frictionally by the other set, means for bringing the two sets of wheels into and out of frictional engagement, and connections between each set of wheels and said engine.

4. In a locomotive, an engine, main drive wheels connected to said engine, secondary drive wheels independently connected to said engine and positioned above said main drive wheels, supporting means for said secondary drive wheels, and means for raising and lowering said supporting means to move said secondary drive wheels into and out of frictional driving engagement with said main drive wheels.

5. In a locomotive, an engine, main drive wheels connected to said engine, secondary drive wheels independently connected to said engine and positioned above said main drive wheels, spring suspension means for said secondary drive wheels, and means for adjusting said spring suspension means to move said secondary drive wheels into and out of frictional driving engagement with said main drive wheels.

6. In a locomotive, an engine, main drive wheels, secondary drive wheels positioned above said main drive wheels, spring suspension means for said secondary drive wheels comprising springs, hangers connected to the ends of the springs, cams for raising and lowering said hangers, a shaft carrying said cams, and rack and pinion means for rotating said shaft.

7. In a locomotive, an engine, main drive wheels, secondary drive wheels positioned above said main drive wheels, spring suspension means for said secondary drive wheels comprising springs, hangers connected to the springs, cams for raising and lowering said hangers, a shaft carrying said cams, rack and pinion means for rotating said shaft, and power means controllable by the operator for actuating said rack and pinion means.

8. In a locomotive, an engine, main drive wheels, secondary drive wheels positioned above said main drive wheels, spring suspension means for secondary drive wheels comprising springs, links connecting said springs, eccentrics engaging said links for raising and lowering said springs and the wheels suspended therefrom, shafts carrying said eccentrics, pinions on said shafts, a rack member meshing with said pinions, and means for operationg said rack member.

9. In a locomotive, an engine, a set of main drive wheels, a set of secondary drive wheels positioned above said main drive wheels, spring suspension means for said secondary drive wheels comprising springs, links connecting the springs, eccentrics engaging the links for raising and lowering the springs and the wheels suspended therefrom, shafts carrying the eccentrics, pinions on the shafts, a rack member meshing with the pinions, means for operating the rack member, and equalizing means connecting the spring suspension means of the sets of drive wheels.

10. In a locomotive, an engine, main drive wheels, secondary drive wheels directly connected to said engine and adapted to engage said main drive wheels to operate the latter by direct drive from the engine, said secondary drive wheels being adapted to be moved out of engagement with said main drive wheels, and driving connections between said engine and said main drive wheels for indirectly driving the latter while the secondary drive wheels are out of engagement therewith.

11. In a locomotive, an engine, main drive wheels, secondary drive wheels directly connected to said engine and adapted to engage said main drive wheels to operate the latter by direct drive from the engine, spring suspension means for said secondary drive wheels, means for adjusting said suspension means to move said secondary drive wheels into and out of engagement with said main drive wheels, an air compressor actuated by the engine, a fluid motor connected to said air compressor and driving connections between said fluid motor and said main drive wheels for operating the latter while the secondary drive wheels are out of engagement therewith.

12. In a locomotive having an under frame, an engine, axles supported by said frame, main drive wheels carried by said axles and connected to said engine, secondary drive wheels connected to said engine and adapted to be moved into and out of frictional driving contact with said main drive wheels and spring suspension means arranged to shift the weight of the locomotive from said axles to the points at which the secondary drive wheels engage the main drive wheels.

In testimony whereof I hereby affix my signature.

KRISTIAN RASMUSSEN.